United States Patent
Isaac et al.

(10) Patent No.: US 8,118,650 B2
(45) Date of Patent: Feb. 21, 2012

(54) CROP RESIDUE FLOW DISTRIBUTOR FOR AN AGRICULTURAL COMBINE

(75) Inventors: Nathan E. Isaac, Lancaster, PA (US); Andrew V. Lauwers, Stevens, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/730,718

(22) Filed: Mar. 24, 2010

(65) Prior Publication Data
US 2011/0237316 A1    Sep. 29, 2011

(51) Int. Cl.
*A01F 12/30* (2006.01)
(52) U.S. Cl. .................................................. 460/111
(58) Field of Classification Search ...... 460/8, 111–113, 460/901
See application file for complete search history.

(56) References Cited

U.S. PATENT DOCUMENTS

| | | | |
|---|---|---|---|
| 2,500,682 A | 3/1950 | Hoffstetter | |
| 3,170,264 A | 2/1965 | Waldrum | |
| 5,797,793 A | 8/1998 | Matousek et al. | |
| 6,238,286 B1 | 5/2001 | Aubry et al. | |
| 6,406,368 B1 | 6/2002 | Cruson et al. | |
| 6,547,169 B1 * | 4/2003 | Matousek et al. | 239/661 |
| 6,602,131 B2 * | 8/2003 | Wolters | 460/111 |
| 6,616,528 B2 * | 9/2003 | Wolters et al. | 460/111 |
| 6,663,485 B2 | 12/2003 | Niermann | |
| 6,769,980 B2 * | 8/2004 | Wolters et al. | 460/112 |
| 6,893,340 B1 | 5/2005 | Schmidt et al. | |
| 6,939,221 B1 | 9/2005 | Redekop et al. | |
| 7,223,168 B2 * | 5/2007 | Anderson et al. | 460/111 |
| 7,261,633 B2 | 8/2007 | Benes | |
| 7,331,855 B2 | 2/2008 | Johnson et al. | |
| 7,390,253 B2 * | 6/2008 | Farley et al. | 460/111 |
| 7,487,024 B2 * | 2/2009 | Farley et al. | 701/50 |
| 7,553,227 B2 * | 6/2009 | Landuyt | 460/111 |
| 2009/0325659 A1 * | 12/2009 | Overschelde et al. | 460/112 |

* cited by examiner

*Primary Examiner* — Thomas Will
*Assistant Examiner* — Joan Misa
(74) *Attorney, Agent, or Firm* — Michael G. Harms; Sue Watson

(57) ABSTRACT

An adjustable flow distributor for a spreader of an agricultural combine operable for discharging a flow of straw and other crop residue in a sideward direction for deposition over a field, the flow distributor including an edge portion oriented at an oblique angle to a reference such as a back plate of the spreader, defining an oblique shaped space therebetween, the edge portion being pivotally adjustable in the fore and aft direction for controlling the portions of the flow of crop residue deposited beneath the spreader and discharged sidewardly therefrom, respectively, for instance, so as to better and more evenly distribute the crop residue over a swath of an agricultural field from which the crop was harvested, particularly a region of the swath in proximity to the spreader and/or chopper.

20 Claims, 10 Drawing Sheets

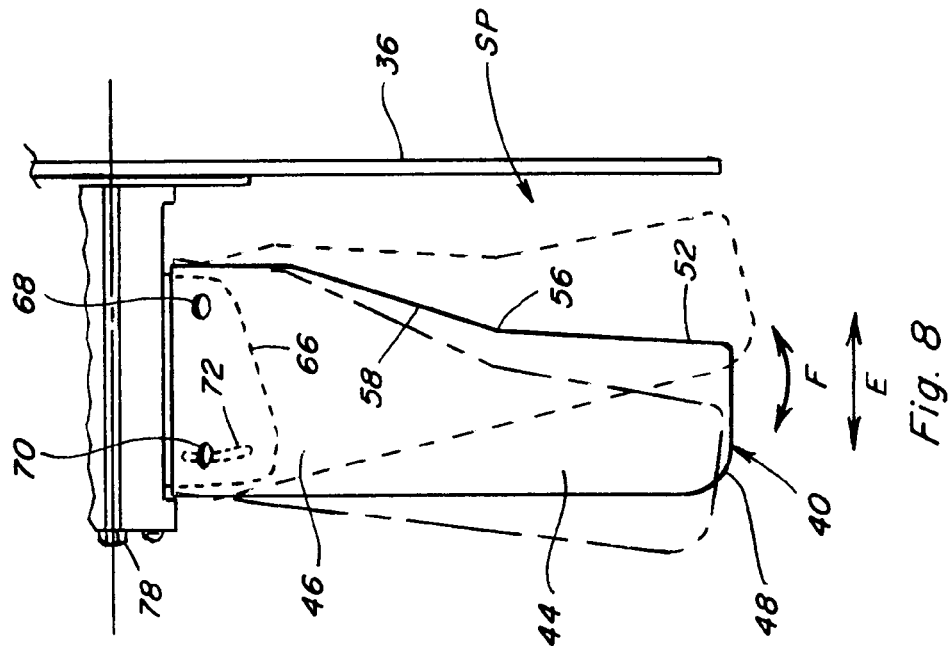
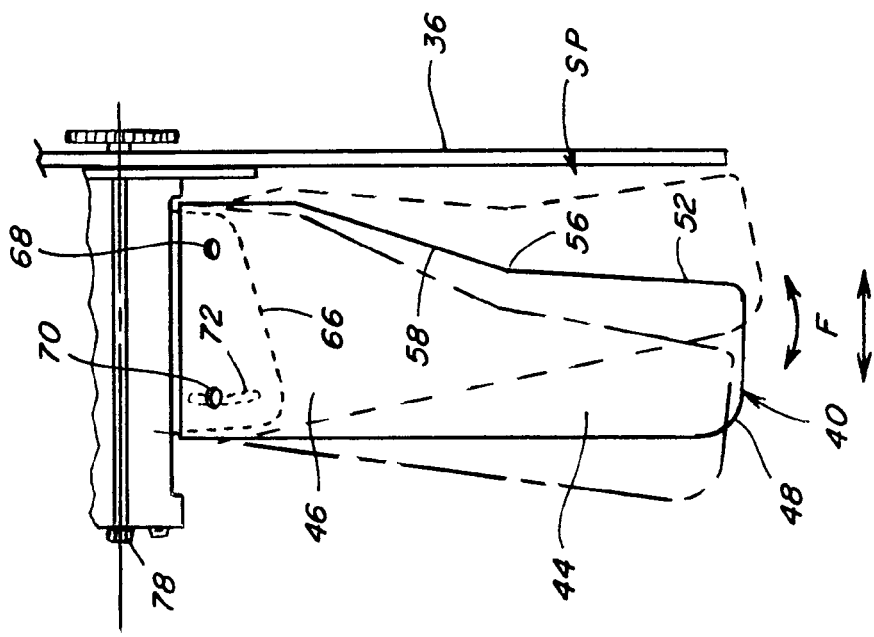

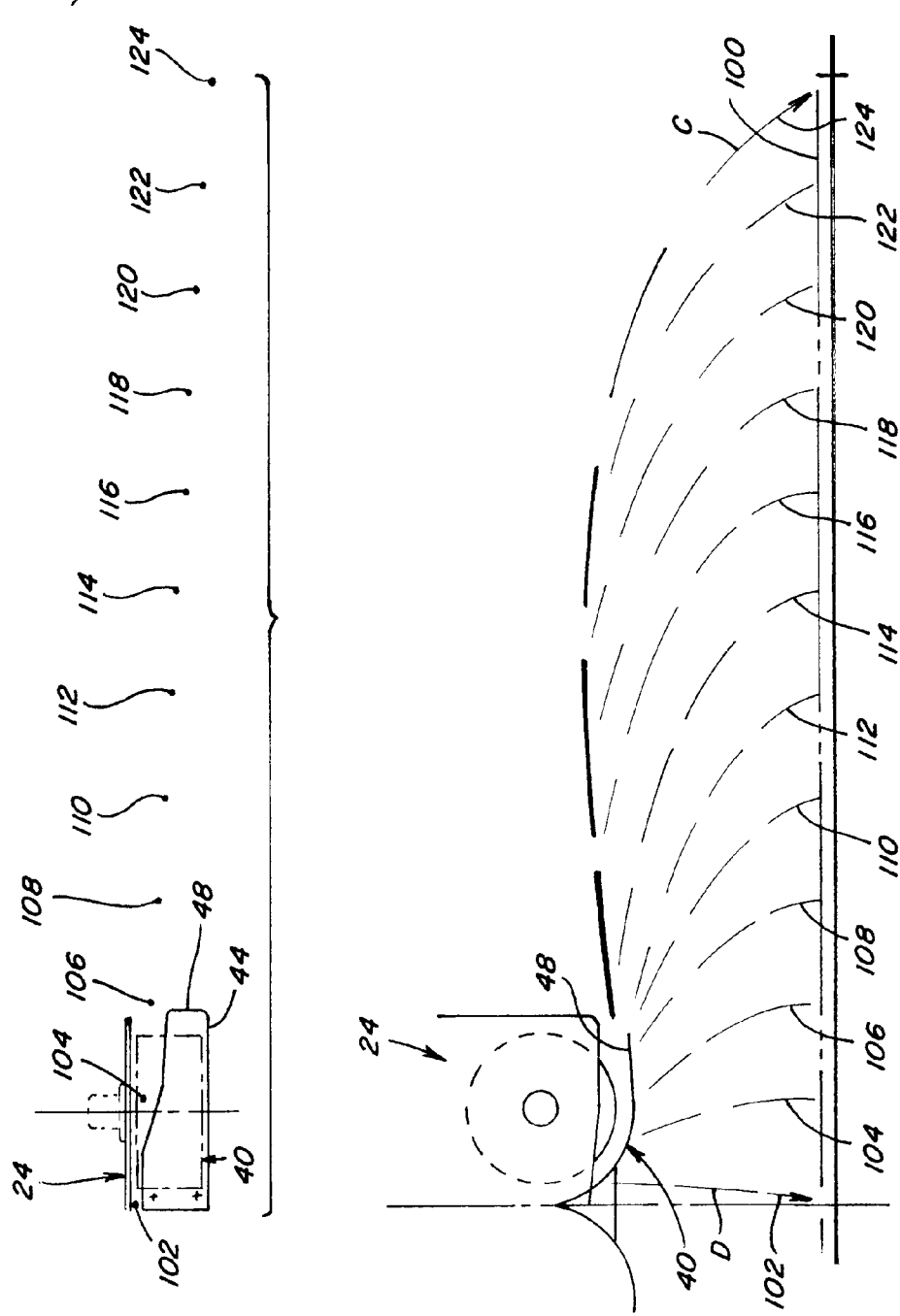

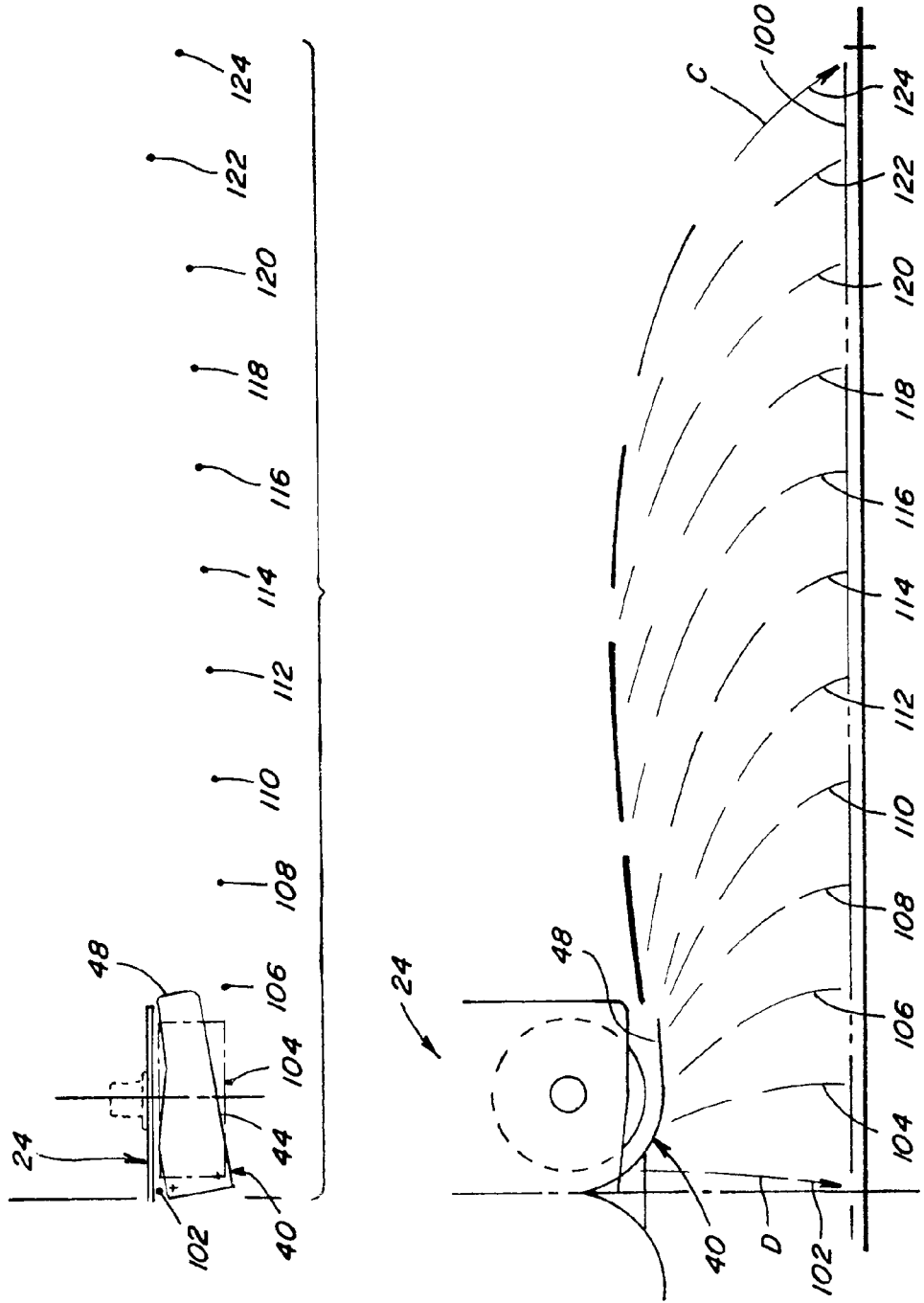

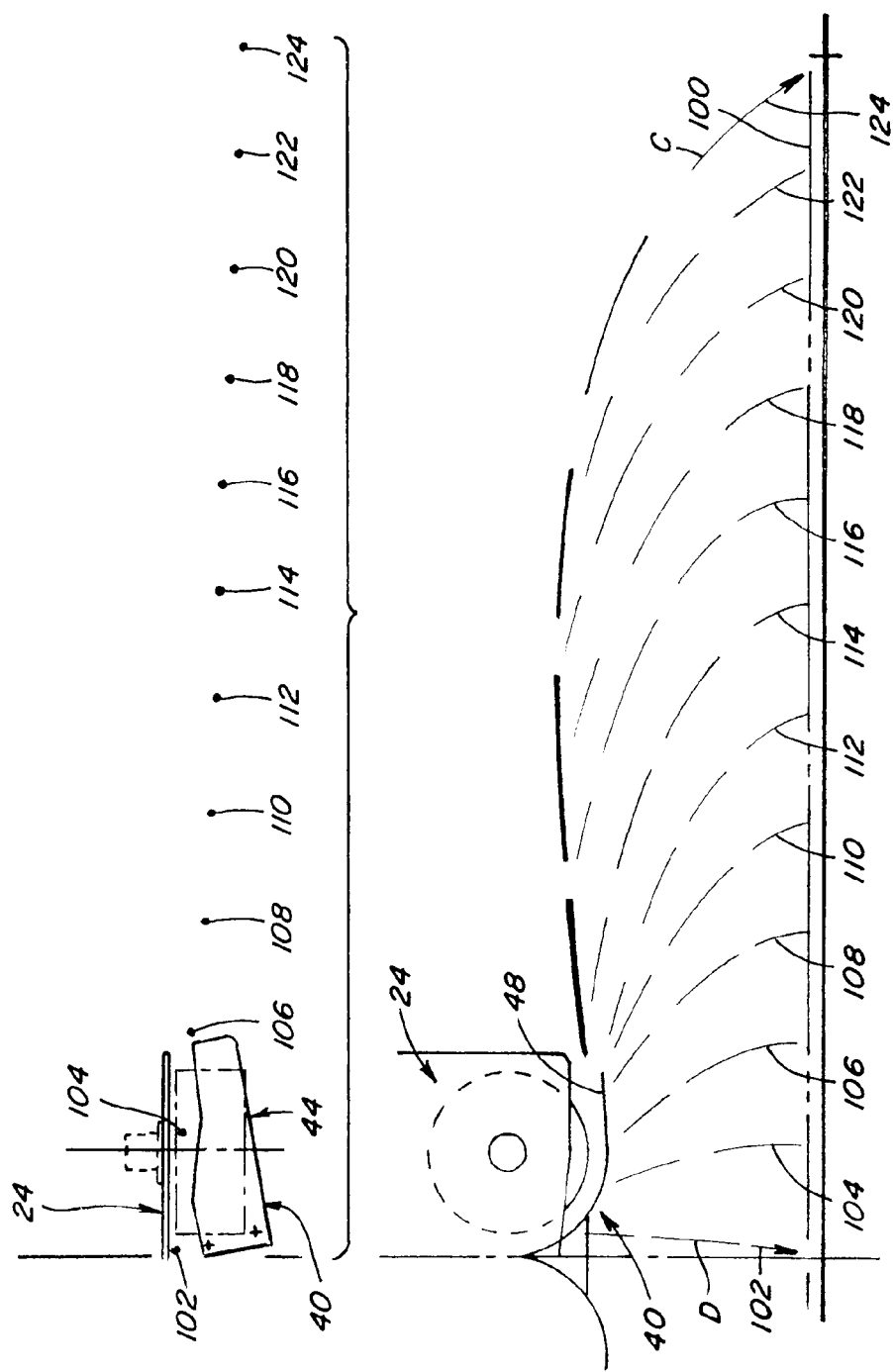

CROP RESIDUE FLOW DISTRIBUTOR FOR AN AGRICULTURAL COMBINE

TECHNICAL FIELD

This invention relates generally to an agricultural combine, and more particularly, to a flow distributor for a spreader operable for discharging a flow of straw and other crop residue therefrom for deposition over a field, the flow distributor including a flow guide having at least one edge which, in combination with at least fore and aft angular adjustability of the flow guide, allows control of portions of the flow of crop residue deposited beneath the spreader and discharged sidewardly therefrom, respectively, for instance, so as to better and more evenly distribute the flow over a swath of an agricultural field from which the crop was harvested.

BACKGROUND ART

Currently, combines typically include a crop residue spreader for disposing of straw and other residue separated from the harvested crop onto the field from which the crop was harvested. In addition, some combines have a chaff spreader for spreading chaff residue separated from the grain by the cleaning apparatus or system onto the crop field. In many instances it is desirable for the straw, chaff and other residue to be spread as evenly as possible over the width or swath of that section of the field over which the combine has just passed and harvested the crop from, to avoid problems resulting from uneven spreading, such as, but not limited to, difficulty in passage of fall tillage tools through residue clumps or thick areas; uneven insulation of the field resulting in uneven field warming and thawing and crop emergence during the following planting season; and increased rodent and insect habitat. In some instances, it is also desirable to have an ability to adjust the spreading to compensate for crop type, varying moisture and weather conditions, such as wind and the like, and also combine header width.

Although various crop residue spreaders are known which can propel residue a distance equal to about one half the width of a typical combine header, many suffer from shortcomings, including a tendency to provide uneven crop residue distribution or coverage in the side to side direction over the swath. More particularly, for a vertical spreader, that is, a spreader utilizing one or more rotary impellers or other elements rotatable about a generally horizontal axis, or an axis oriented or tilted at a small acute angle to horizontal, and configured for directing a flow or flows of crop residue sidewardly, it has been found that the resultant coverage has a tendency to be uneven in the sideward direction, for instance, typically thicker toward the outer regions or sides of the swath, and thinner or less uniform closer to the center of the swath.

Thus, what is sought is a crop residue flow distributor for a crop residue spreader, having a capability to adjustably distribute or guide portions of a discharged flow of crop residue for achieving a desired pattern of the distributed residue, which can include particularly, more even distribution side to side over a region of an agricultural field from which the crop was harvested, to achieve the advantages, and overcome one or more of the shortcomings and limitations set forth above.

Various conditions, such as wind condition, can affect crop residue flow and distribution over a field, which conditions, particularly wind direction, speed, etc., can change, often virtually continuously due to atmospheric conditions and the like, and also due to directional changes of the combine itself, for example, harvesting in head lands and traversing swaths of a field in different directions. In addition, field condition and crop characteristics, such as moisture content and crop population, can affect crop residue flow and distribution and can change as swaths of a field are harvested. Swaths with a higher moisture content and denser crop population would not have the same crop residue distribution pattern as swaths with a lower moisture content and sparser crop population. These conditions can make having a capability to change crop residue discharge flow, easily, and on the go, essential to achieving the desired residue spread.

SUMMARY OF THE INVENTION

What is disclosed is a crop residue flow distributor for the discharge outlet of a crop residue spreader of an agricultural combine which overcomes one or more of the shortcomings and limitations set forth above.

According to a preferred aspect of the invention, the flow distributor includes a flow guide having a first end portion, a second end portion opposite the first end portion, and opposite fore and aft edges extending between the first and second end portions defining a crop residue flow surface extending therebetween. The flow guide is supported on a combine, preferably directly on the spreader, with at least the first end portion disposed beneath a generally downwardly facing discharge opening of the spreader such that the crop residue flow surface is located generally beneath the opening and extends sidewardly outwardly relatively thereto to the second end portion of the flow guide, for carrying and guiding a first portion of a flow of crop residue discharged from the opening so as to flow sidewardly and outwardly from the spreader for distribution over a field. At least one of the fore edge and the aft edge includes an edge portion oriented at an oblique angle to a reference plane perpendicular to an axis of rotation of an impeller of the spreader. The edge portion bounds and defines, in part, an oblique shaped space beneath the discharge opening such that a second portion of the flow of crop residue will pass through the oblique shaped space beneath the discharge opening so as to be distributed beneath the spreader.

Importantly, the flow distributor includes an adjusting mechanism operable for moving the edge portion such that points therealong will move at different rates in relation to the reference plane to change the oblique shape of the space for controlling the second portion of the flow of crop residue distributed beneath the spreader, for instance, so as to provide more even and uniform coverage side to side over a swath of a field, including the region beneath the spreader itself.

According to another preferred aspect of the invention, the adjusting mechanism is further operable for adjustably moving the flow guide in the fore and aft directions to position at least one of the fore and aft edges of the flow guide for metering a portion of the flow so as to be distributed on a region of a field in an altered manner.

According to still another preferred aspect of the invention, at least one of the fore and aft edges of the flow guide used for metering the flow can have a special shape, such as a tapered shape, for distributing portions of a crop residue flow thereover at different sideward distances from the spreader, as a function of a fore and aft location of the edge and the oblique angle of the edge.

According to still further preferred aspects of the invention, the crop residue flow surface of the flow guide can have an upwardly and sidewardly outwardly facing concave shape, so as to be capable of guiding a flow of crop material discharged downwardly from the discharge opening sidewardly and outwardly therefrom.

The adjusting mechanism can include one or more actuators remotely controllable for pivoting the second end of the flow guide about a point on the flow guide for adjusting the oblique angle and varying the space beneath the discharge opening and for moving the flow guide in the fore and aft directions relative to the discharge opening.

BRIEF DESCRIPTION OF THE DRAWINGS

Other and additional embodiments of the invention and forms of components thereof, including various forms of the flow guide element portion, may be derived and will become apparent from a consideration of the following detailed specification in conjunction with the accompanying drawings.

FIG. 7 is a fragmentary left side view of the spreader illustrating the flow distributor thereof in various positions relative to a back plate of the spreader;

FIG. 8 is another fragmentary left side view of the spreader illustrating the flow distributor thereof in various positions relative to a back plate of the spreader;

FIG. 9 is a simplified schematic rear view of a right rear end of the spreader and flow distributor, in combination with a bottom view thereof, diagrammatically illustrating characteristics of a pattern of crop residue flow distribution therefrom;

FIG. 10 is another simplified schematic rear view of a right rear end of the spreader and flow distributor, in combination with a bottom view thereof, diagrammatically illustrating characteristics of a pattern of crop residue flow distribution therefrom; and FIG. 11 is yet another simplified schematic rear view of a right rear end of the spreader and flow distributor, in combination with a bottom view thereof, diagrammatically illustrating characteristics of a pattern of crop residue flow distribution therefrom.

DETAILED DESCRIPTION OF THE INVENTION

Figure 1:
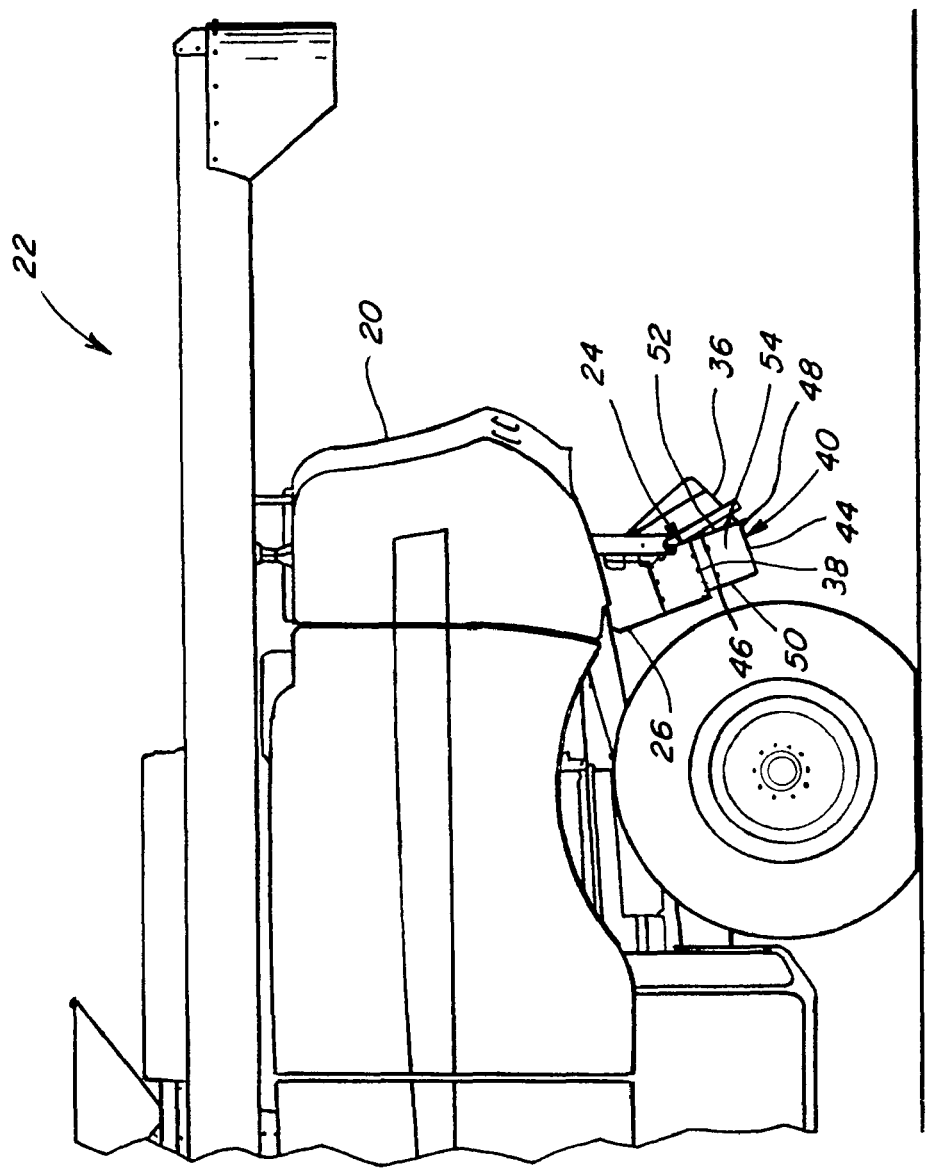
FIG. 1 is a simplified, fragmentary side view of the rear end of an agricultural combine including a pair of adjustable crop residue flow distributors for a spreader of the combine.

Referring now to the drawings, wherein preferred embodiments of the present invention are shown, in FIG. 1, a rear end 20 of a self-propelled agricultural combine 22 is shown, including a vertical crop residue spreader 24 operable for spreading straw, stalks, and other crop residue and trash that has been separated from the grain of the crops by a threshing mechanism (not shown) of combine 22 located forwardly of rear end 20. The straw, stalks and the like are propelled rearwardly by rotating beaters or the like (also not shown) from the threshing mechanism and downwardly through a rear cavity of combine 22 to vertical spreader 24 for spreading and optionally chopping thereby, all in the well known manner.

Figure 2:
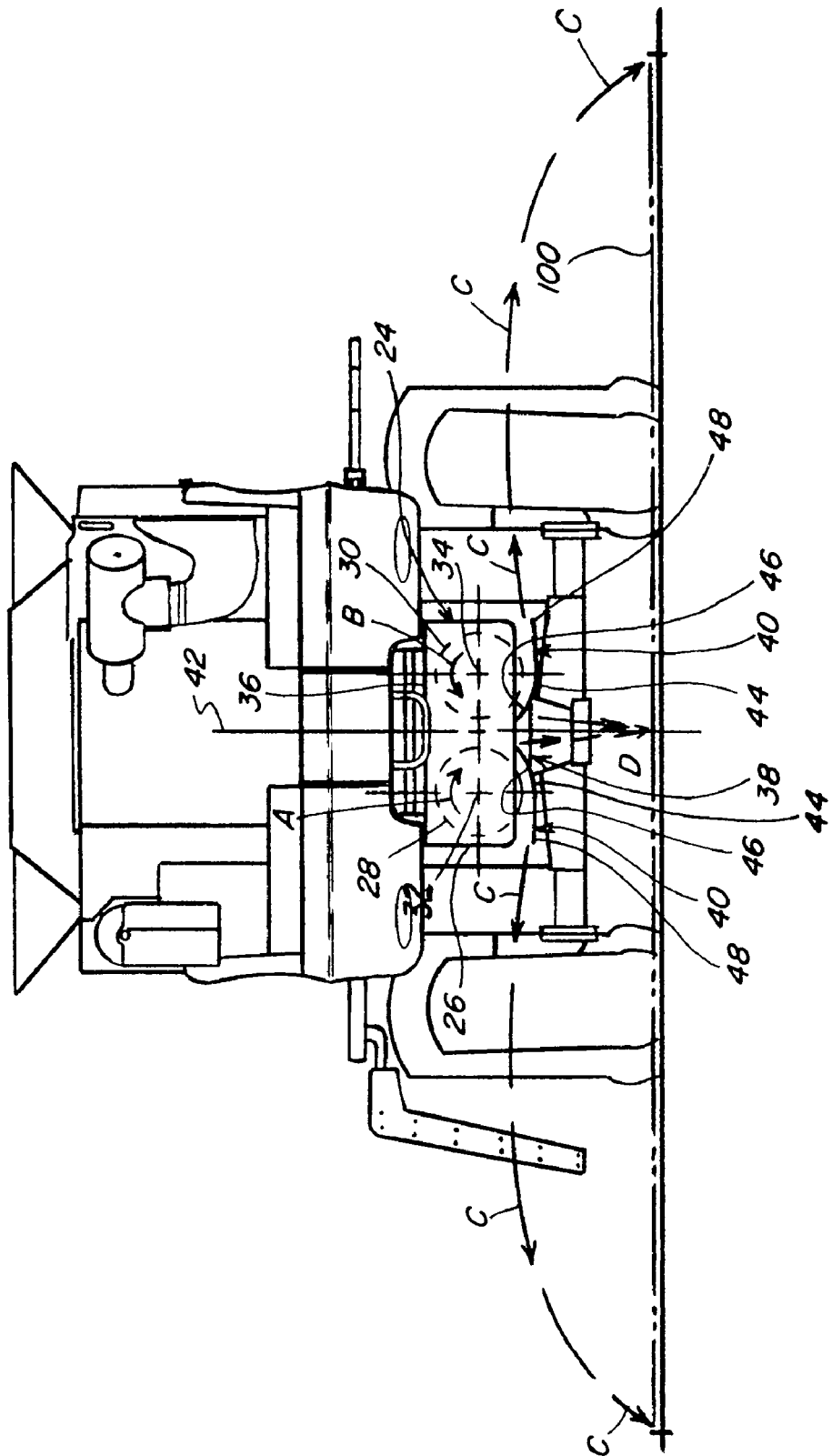
FIG. 2 is a rear view of the combine, generally depicting the location of the crop residue distribution system including the spreader and adjustable flow distributors.
Figure 3:
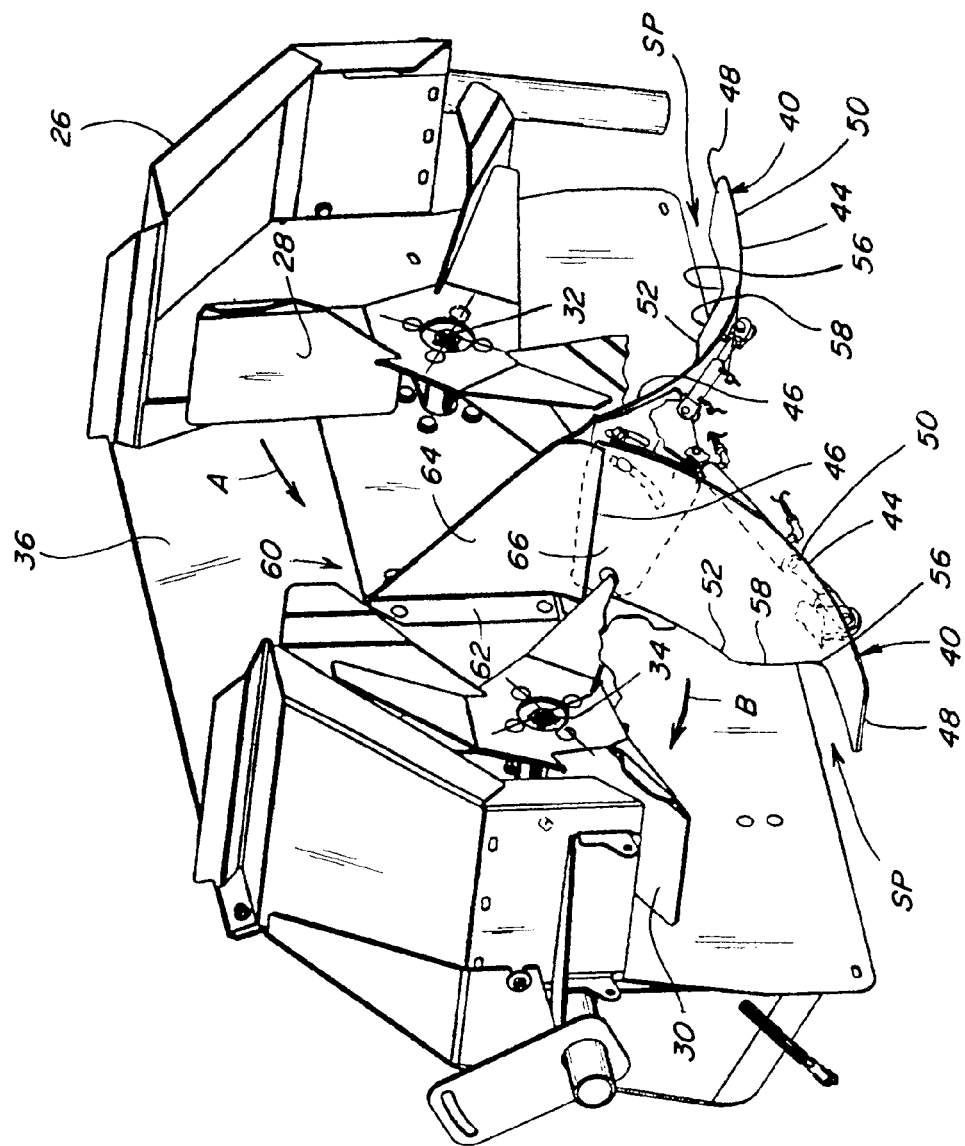
FIG. 3 is perspective view of a portion of the spreader showing the positioning of impellers of the spreader relative to the flow distributors.
Figure 4:
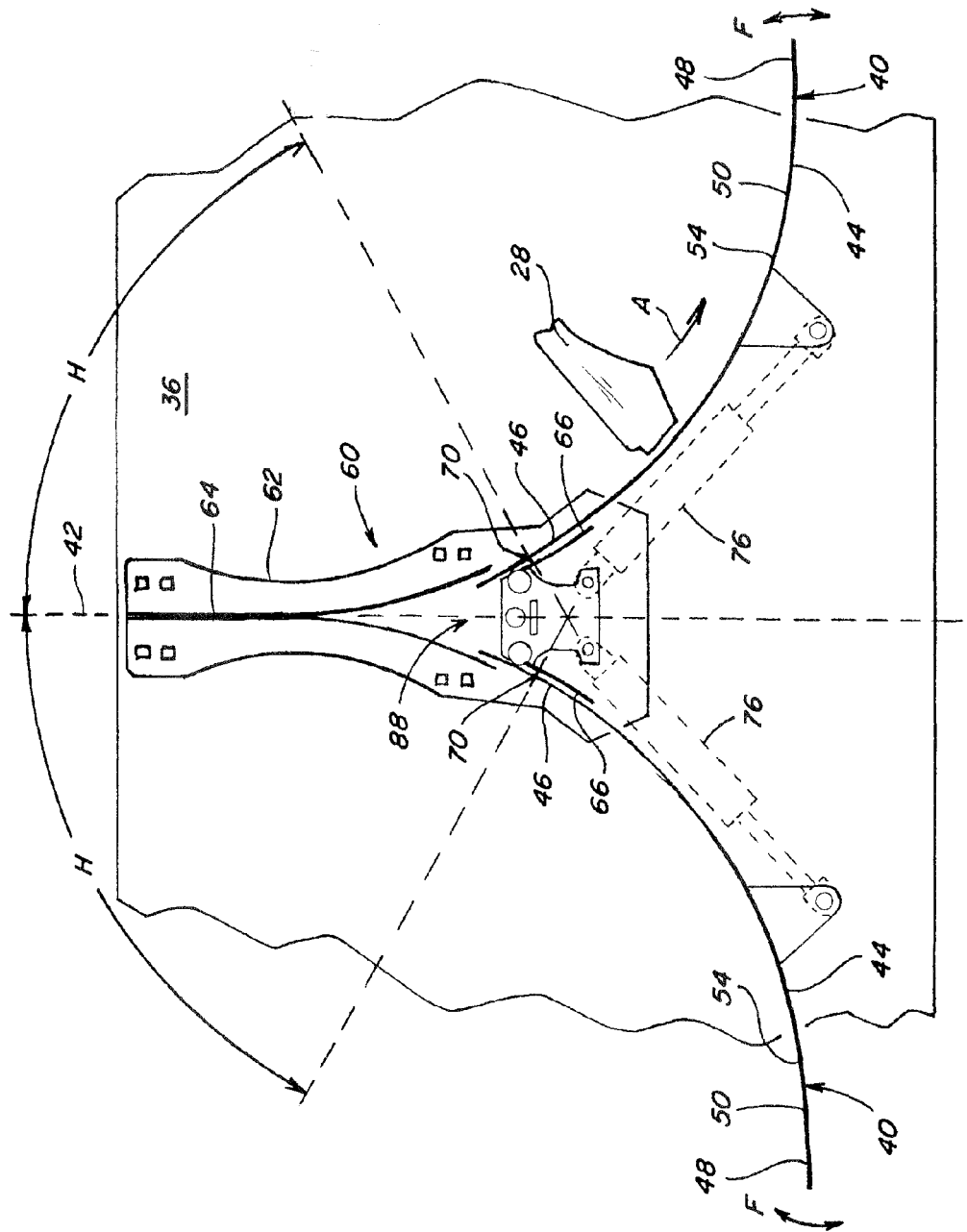
FIG. 4 is a an enlarged front view of the adjustable flow distributors.

Referring also to FIGS. 2 and 3, spreader 24 includes a housing 26 of sheet metal or other construction containing a pair of side by side rotary impellers 28 and 30 rotatable in opposite predetermined rotational directions, denoted by arrows A and B, about a pair of rotational axes 32 and 34, respectively. Here, it should be understood that impellers 28 and 30 are representative of a variety of rotary devices that can be utilized in a spreader of this type, such as a rotor having fixed blades, or carrying a plurality of knives, such as flail knives, for propelling the crop residue outwardly from the housing. The spreader can additionally optionally include a rank of fixed knives through which the rotating knives pass for chopping crop residue.

Impellers 28 and 30 are rotated by suitable driving elements, such as by conventionally constructed and operable hydraulic motors powered by pressurized hydraulic fluid received from a pump (not shown) of combine 22, an electric motor, belt, or the like, again in the well known manner. Rotational axes 32 and 34 extend at least generally in the fore and aft directions, that is, generally forwardly and rearwardly with respect to combine 22, and are generally horizontal or oriented at a small acute angle to horizontal, depending on an orientation or tilt of spreader 24 on combine 22, which can be optionally variable and adjustable in the well known manner.

Housing 26 of spreader 24 includes spaced, opposed radial side walls, and a back plate 36 extending therebetween across the width of spreader 24, defining an internal cavity containing impellers 28 and 30. Housing 26 defines a forwardly and upwardly facing inlet opening for receiving the residue flow from the threshing system, and a downwardly facing discharge opening 38, through which the residue is propelled downwardly and in opposite sideward directions by impellers 28 and 30, respectively.

Residue flow within housing 26 is propelled by rotating impellers 28 and 30 in the predetermined rotational directions A and B along circumferential flow paths, at speeds equal to or increased relative to the inlet speed of the residue flow such that the residue does not build up at the inlet and is expelled from housing 26 through discharge opening 38 at a corresponding speed to a pair of adjustable crop residue flow distributors 40 supported on spreader 24 beneath discharge opening 38. Crop residue flow distributors 40 are mirror images of one another, and thus can be described and discussed singularly when appropriate, and are positioned for use in cooperation with respective impellers 28 and 30 (FIGS. 2 and 3) of spreader 24 for receiving and carrying flows of crop residue discharged through discharge opening 38, in opposite sideward directions outwardly away from spreader 24, for distribution in a desired pattern on sides of a just harvested swath of a field over which combine 22 is moving. Here, it should be understood that by the term "sideward" what is meant is a direction transverse the fore and aft directions, the term "sidewardly outwardly" thus meaning sidewardly away from a center line 42 (FIG. 2) of spreader 24, the term "sidewardly inwardly" meaning closer to center line 42.

As noted above, it is desired in many instances to distribute the crop residue discharged by impellers 28 and 30 substantially evenly over the width of a swath of the field from which the crop has just been harvested by combine 22, which width is typically defined by the overall width of a harvesting head of combine 22, which width can be as much as 30 to 40 feet in the instance of some headers currently in use. Thus, it is desirable that rotary impellers 28 and 30 have the capability to expel or propel crop residue a distance of up to about 20 feet or so therefrom, corresponding to one-half the width of the header used on combine 22, and possibly farther as combine headers of greater width are introduced. Impellers 28 and 30 can be suitably configured and rotated at a sufficient velocity for propelling crop residue such as, but not limited to, chopped straw, stems and branches, cobs and the like, the required distance of up to one-half the width of a header currently being used, by a conventional hydraulic motor or any other suitable driver as mentioned above. The problem to be currently overcome, however, is distributing the crop residue substantially evenly over this distance of up to about 20 feet or so particularly including in the region of a swath directly beneath spreader 24.

Referring also to FIGS. 4, 5, 6, 7 and 8, to overcome the problem set forth above, adjustable flow distributors 40 are constructed and operable according to the teachings of the present invention for controlling the flow of crop material deposited beneath spreader 24. Each of flow distributors 40 preferably includes a flow guide 44 of suitable, rigid construction, such as of sheet metal, or plastics, having a first end portion 46 supported adjacent to discharge opening 38 in the vicinity of center line 42 in a position so as to receive at least a portion of the crop residue flow discharged through opening 38. Flow guide 44 includes a second end portion 48 opposite first end portion 46, and a fore edge 50 and an opposite aft edge 52 extending between first and second end portions 46 and 48 defining a crop residue flow surface 54 extending between end portions 46 and 48. At least aft edge 52 includes an edge portion 56 which is oriented at an oblique angle to a reference plane generally parallel to back plate 36 thereby defining an oblique shaped space denoted SP beneath discharge opening 38. As used herein, an oblique shaped space refers to a space bounded by an oblique angle. As the crop residue flow is discharged from opening 38, a first portion of the crop residue will strike and flow sidewardly along flow surface 54 and sidewardly therefrom so as to be distributed thereby over a region of a field located sidewardly of spreader 24, and a second portion of the flow of crop residue will pass through oblique shaped space SP beneath discharge opening 38 so as to be distributed beneath spreader 24. This distribution is illustrated by strings of oppositely directed arrows C and downwardly directed arrows D in FIG. 2, for distribution in a pattern on a field, represented by dotted line 100 in FIG. 2, having desired characteristics, such as uniformity and evenness of crop residue distribution.

Flow guide 44 is additionally preferably elongated in the sideward direction, and crop residue flow surface 54 preferably has an upwardly directed concave shape. Additionally, at least aft edge 52 includes a tapered portion 58 bounding and defining the oblique shaped space and which extends diagonally forwardly and sidewardly outward toward second end portion 48, such that a portion of crop residue flow surface 54 adjacent to second end portion 48 of the flow guide, is reduced in fore and aft extent, compared to a portion of surface 54 adjacent to first end portion 46.

Referring more particularly to FIGS. 3, 4, 5, and 6, each of flow guides 44 is preferably supported on combine 22, and more preferably on spreader 24, by adjustable support structure 60. Structure 60 preferably includes a rear plate 62 mountable in a suitable manner, such as using bolts or other fasteners, to a central region of back plate 36 of spreader 24, so as to be at least generally aligned with center line 42 of spreader 24. Support structure 60 includes a center flow divider 64 connected to plate 62 and extending forwardly therefrom, so as to be disposed between impellers 28 and 30 for dividing crop residue flow therebetween. Each of flow guides 44 is mountable in a suitable manner, such as using bolts or other fasteners, to flow divider 64 through a hinge plate 66 at attachment points 68 and 70. Second end 48 of flow guide 44 is pivotable about attachment point 68 as attachment point 70 is moved through arced slot 72 as denoted by arrows F. Pivoting second end 48 varies the oblique angle formed between edge portion 56 and the reference location, which is selected here as the plane or surface of back plate 36. Variation of the oblique angle changes the size and oblique shape of space SP, which controls at least mostly, the second portion of the flow of residue distributed beneath the spreader. Additionally, the profile of flow guide 44 is changed which controls the distribution of the first portion of the flow of crop residue distributed sidewardly of spreader 24.

Figure 6:
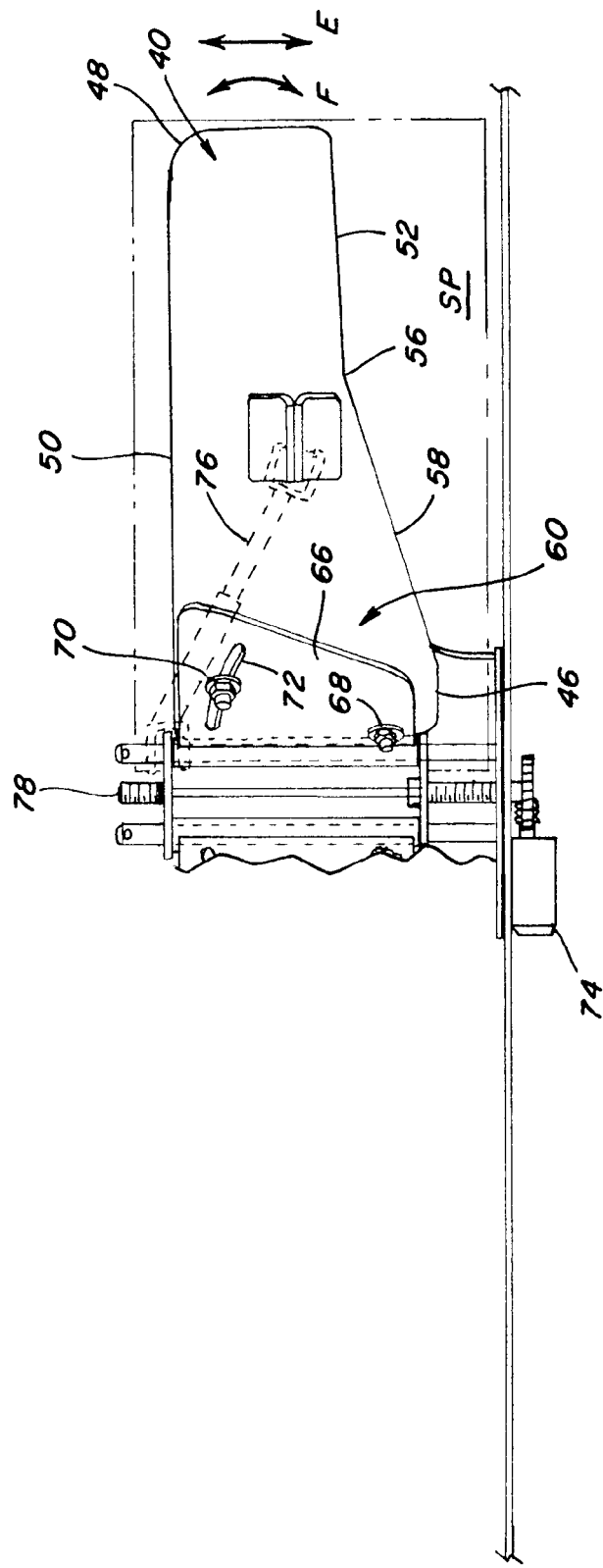
FIG. 6 is a fragmentary bottom view of one of the flow distributors with an actuator shown in phantom.

As shown in FIG. 6 remotely controlled actuator 76 can be suitably mounted to each of flow guides 44 for controlling the fore and aft rotational movement, as well as upward and downward movement, of second end 48. Actuators 76 can be any suitable commercially available devices, such as, but not limited to, electric or other motors, cylinders, solenoids, or the like, and can be controlled from a suitable location such as an operator cab of the combine. Because of the shape of slot 72 and the angle at which actuator 76 is mounted, as actuator 76 extends, second end 48 of flow guide 44 will pivot downward away from impellers 28 and 30 and towards back plate 36. Conversely, as actuator 76 retracts, second end 48 of flow guide 44 will pivot upward towards impellers 28 and 30 and away from back plate 36. This motion can be reversed if hinge plate 66 is reversed thus allowing flow guide 44 to move downward and away from back plate 36 as actuator 76 is extended. It is important to note that flow guide 44 is attached along an axis 72 at an angle denoted H from center line 42 of spreader 24. Variation of angle H will vary the overall pivoting movement of flow guide 44, for example by increasing or decreasing the amount of downward movement of flow guide 44 as second end 48 is pivoted towards back plate 36. In addition, variation of angle H will also result in variations of the oblique shape of space SP.

Figure 5:
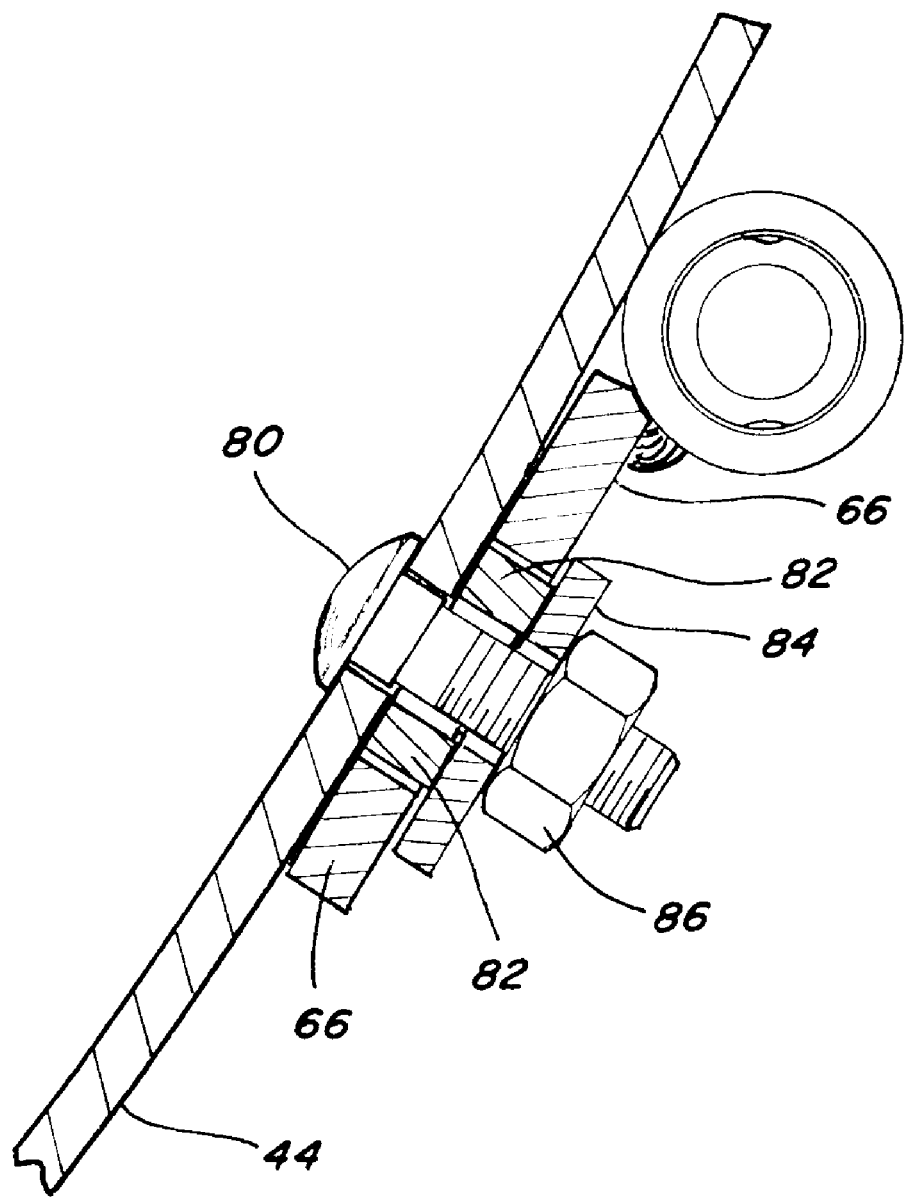
FIG. 5 is a detailed enlargement of an attachment point of the flow distributor.

FIG. 5 shows an enlarged detailed view of attachment point 70 of left flow guide 44. Attachment point 70 includes a bolt 80 placed through flow guide 44 inserted through bushing 82 inside slot 72 of hinge plate 66. An oversized washer 84, preferably with a low coefficient of friction, is placed between hinge plate 66 and nut 86. This arrangement allows for controllable, free pivoting motion of flow guide 44.

Additionally, with reference to FIGS. 4-8, flow guides 44 are supported at a carrier bracket 88 which extends downwardly from divider 64 and is movable in the fore and aft directions with flow guides 44. Carrier bracket 88 additionally includes an elongate threaded member 78 supported for rotation on support structure 60 for jointly moving flow guides 44 in the fore and aft directions relative to discharge opening 38, as denoted by arrows E. That is, by rotation of threaded member 78 in a first rotational direction, for example, by a remotely controllable actuator 74, simultaneous movement of both flow guides 44 in a first of the fore and aft directions is achieved, and by rotation of member 78 in an opposite rotational direction, simultaneous movement of flow guides 44 in an opposite one of the fore and aft directions is achieved.

FIGS. 7 and 8 illustrate representative positions of flow guide 44 relative to the reference location which here is the plane or surface of back plate 36 and discharge opening 38 of spreader 24. It is contemplated that flow guides 44 are positionable at any of a range of positions between those shown in FIGS. 7 and 8. FIG. 7 illustrates flow guide 44 in a more aft position relative to discharge opening 38, while FIG. 8 illustrates flow guide 44 in a more forward position relative to discharge opening 38. As shown in both figures, as second end 48 of flow guide 44 is pivoted about attachment point 68 in the fore and aft direction denoted by arrow F, the oblique angle between edge portion 56 and back plate 36 varies as does the size and oblique shape of space SP beneath discharge opening 38. To increase the second portion of the flow of crop residue deposited beneath spreader 24, second end 48 of flow guide 44 is pivoted forward, increasing the oblique angle between edge portion 56 and back plate 36, and/or flow guide 44 is moved in the forward direction. Conversely, to decrease the second portion of the flow of crop residue deposited beneath spreader 24, second end 48 of flow guide 44 is pivoted aft, decreasing the oblique angle between edge portion 56 and back plate 36, and/or flow guide 44 is moved in the aft direction. An important advantage of the ability to combine fore and aft movement with pivotal fore and aft movement is the ability to create additional profiles along aft edge 52 of flow guide 44 for achieving the uniform distribution of crop residue or other desired result.

FIGS. 9, 10 and 11 illustrate representative crop residue distribution patterns which are possible using flow distributor 40 in cooperation with a vertical spreader such as spreader 24 on combine 22. Again, as discussed in reference to FIG. 2, a substantially even or uniform crop residue distribution pattern, denoted by line 100, can be achieved as between flows C and D, by making required adjustments of the position of distributor 40 in the above discussed manner. In FIGS. 9, 10, and 11, flow guide 44 is moved to different representative positions to compensate for one or more of a variety of conditions that can affect crop residue distribution over a field. Examples of such conditions include, but are not limited to, variations in wind direction and/or speed due to atmospheric conditions and/or directional changes of combine 22, variations in field condition and crop characteristics, such as moisture content of the crop, crop population, and the like. The dots 102, 104, 106, 108, 110, 112, 114, 116, 118, 120, 122, and 124 in FIGS. 9, 10, and 11 illustrate approximate locations along pattern 100 where crop residue flowing along the correspondingly numbered lines will be distributed on a field. As can be seen in the figures, the ability to change crop residue discharge flow, easily, and on the go, results in uniform crop distribution pattern 100 in each situations depicted in the figures despite one or more of the variety of conditions experienced in each situation.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An adjustable flow distributor for a crop residue spreader of an agricultural combine, comprising:
   a flow guide having a first end portion, a second end portion opposite the first end portion, and opposite fore and aft edges extending between the first and second end portions defining a crop residue flow surface extending therebetween; and
   an adjustable support structure supporting the flow guide with at least the first end portion thereof disposed beneath a downwardly facing portion of a discharge opening of the spreader, the second end portion extending sidewardly beneath the discharge opening such that at least a first portion of a flow of crop residue discharged through the opening will strike and flow sidewardly along the flow surface and sidewardly therefrom so as to be distributed thereby over a region of a field located sidewardly of the spreader, the first end portion is connected to a pivotable member of a movable portion of the support structure such that a portion of the first end portion of the flow guide is pivotable so that the fore edge of the flow guide is movable to form an acute angle or an oblique angle relative to the movable portion of the support structure, the first end portion configured to pivot on a pivot point that is relatively perpendicular to the first end portion of the flow guide, the aft edge includes an edge portion oriented at an oblique angle to a reference plane perpendicular to an axis of rotation of an impeller of the spreader, the edge portion bounding and defining in part an oblique shaped space beneath the discharge opening such that a second portion of the flow of crop residue will pass through the space beneath the discharge opening so as to be distributed beneath the spreader, the support structure including a first adjusting mechanism including an actuator engaged to the movable portion of the support structure and configured and operable for moving the flow guide such that points along the edge portion will move at different rates in relation to the plane to change the oblique shape of the space for controlling the second portion of the flow of crop residue distributed beneath the spreader.

2. The flow distributor of claim 1, wherein at least a portion of the aft edge has a fore and aft extending tapered shape bounding and defining in part the oblique shaped space, and wherein at least the edge portion comprises a metering edge bounding and defining in part the oblique shaped space and the tapered shape extends sidewardly outwardly and forwardly toward the second end portion of the flow guide.

3. The flow distributor of claim 1, further comprising a second adjustable mechanism which includes one attachment point at the pivot point of the first end portion of the flow guide that connects the flow guide to the pivotable member and another attachment point including a bolt positioned through a slot in the first end portion and a portion of the pivotable member that connects the flow guide to the pivotable member.

4. The flow distributor of claim 1, wherein the crop residue flow surface has an upwardly and sidewardly outwardly facing concave shape so as to be capable of guiding a flow of crop residue discharged downwardly from the discharge opening upwardly and sidewardly outwardly therefrom.

5. The flow distributor of claim 1, wherein the flow guide is supported on the pivotable member such that the second end portion thereof is pivotable about the pivotable member of the movable portion for varying the oblique angle to the reference plane and moving the flow surface upwardly and downwardly relative to the discharge opening.

6. The flow distributor of claim 1, wherein the flow guide is supported on the pivotable member such that the second end portion thereof is pivotable about the pivotable member of the movable portion for varying the oblique shape of the space and the second portion of the flow deposited beneath the spreader.

7. The flow distributor of claim 1, wherein the actuator is remotely controllable for moving the second end portion of the flow guide and varying the oblique angle such that the oblique shaped shape beneath the discharge opening will vary in shape as a function of the movement of the second end portion.

8. The flow distributor of claim 1, wherein the first adjusting mechanism is further configured and operable for moving the flow guide in the fore and aft directions relative to the discharge opening via the movable portion and the actuator.

9. A crop residue spreader for an agricultural combine, comprising:
   a housing mountable to a rear end of the combine in position for receiving crop residue from a threshing mechanism thereof and containing an element positioned forward of a back plate of the housing and disposed for rotation in a predetermined direction therein about a generally fore and aft extending rotational axis for generating a rotary flow of the crop residue in the predetermined rotational direction along a circumferential flow path within the housing for discharge therefrom through an at least partially downwardly facing discharge opening bounded and defined in part by the back plate; and
   an adjustable crop residue flow distributor including a flow guide supported by an adjustable support structure, the flow guide having a first end portion and an opposite second end portion, the flow guide including fore and aft edges which extend between the first and second end portions, the first end portion connected to a pivotable member of a movable portion of the support structure and adjustable such that a portion of the first end portion of the flow guide is pivotable so that the fore edge of the flow guide is movable to form an acute angle or an oblique angle relative to the movable portion of the support structure, the first end portion configured to pivot on a pivot point that is relatively perpendicular to the first end portion of the flow guide, at least a portion of the aft edge oriented at an oblique angle relative to the back plate defining a space therebetween, the flow guide being supported adjacent to the discharge opening in a position so as to receive the crop residue flow discharged through the discharge opening for guiding and carrying at least a first portion of the flow sidewardly outwardly away from the spreader and for allowing at least a second portion of the flow to pass through the space between the aft edge and the back plate so as to be distributed beneath the spreader, and a first adjusting mechanism including an actuator engaged to the movable member of the support structure and configured and operable for moving the flow guide such that portions along the aft edge will move at different rates in relation to the back plate for changing the oblique angle and controlling the second portion of the crop residue flow distributed beneath the spreader.

10. The crop residue spreader of claim 9, wherein the first adjusting mechanism is operable for pivoting the second end portion of the flow guide in the fore and aft directions about the pivotable member of the movable portion to vary the oblique angle between the flow guide and the back plate to position at least one of the fore and aft edges of the flow guide beneath the discharge opening in a position such that a first portion of a flow of crop residue discharged through the opening will be guided sidewardly outwardly along the flow guide so as to be distributed onto a region of a field located sidewardly outwardly of the spreader, and the second portion of the flow will flow downwardly past the flow guide through the space defined by the flow guide and the back plate so as to be distributed onto a region of a field located generally beneath the spreader.

11. The crop residue spreader of claim 10, wherein the first adjusting mechanism is further operable for moving the second end portion upwardly and downwardly relative to the discharge opening.

12. The crop residue spreader of claim 9, wherein the flow guide has a curved shape which is concave in the upward direction.

13. The crop residue spreader of claim 9, wherein the first adjusting mechanism is further operable for moving the flow guide in fore and aft directions relative to the discharge opening to enable adjusting a pattern of crop residue distribution over a field.

14. The crop residue spreader of claim 9, wherein the actuator is remotely controllable for moving the flow guide such that points along the aft edge will move at different rates in relation to the back plate for varying the oblique angle.

15. The crop residue spreader of claim 14, further comprising a second adjustable mechanism which includes one attachment point at the pivot point of the first end portion of the flow guide that connects the flow guide to the pivotable member and another attachment point including a bolt positioned through a slot in the first end portion and a portion of the pivotable member that connects the flow guide to the pivotable member.

16. An adjustable flow distributor for a vertical crop residue spreader of an agricultural combine, comprising:
   a flow guide supported on a support structure and having a first end portion, a second end portion opposite the first end portion, and opposite fore and aft edges extending between the first and second end portions defining a crop residue flow surface extending therebetween, the first end portion connected to a pivotable member of a movable portion of the support structure such that the first end portion of the flow guide is pivotable and adjustable so that the fore edge of the flow guide is movable to form an acute angle or an oblique angle relative to the movable portion of the support structure, the first end portion configured to pivot on a pivot point that is relatively perpendicular to the first end portion of the flow guide, the flow guide being supported with the first end portion disposed adjacent to a generally downwardly facing discharge opening bounded and defined in part by an upstanding back plate of a spreader, such that the crop residue flow surface and the fore and aft edges are located generally beneath the opening and extend sidewardly outwardly relative thereto to the second end portion of the flow guide, and
   at least the aft edge situated at an oblique angle relative to the back plate of the spreader; and
   an adjusting mechanism engaged to the movable portion of the support structure and configured and operable for pivotally moving the second end portion of the flow guide in the fore and aft directions about the pivotable member of the movable portion for varying the oblique angle between the aft edge of the flow guide and the back plate.

17. The flow distributor of claim 16, wherein the adjusting mechanism is operable for pivoting the second end portion of the flow guide in the fore and aft directions about the pivotable member of the movable portion to position at least one of the fore and aft edges of the flow guide in a position such that a first portion of a flow of crop residue discharged through the discharge opening will impinge and flow sidewardly outwardly along the flow guide so as to be distributed on a region of a field located sidewardly and outwardly of the spreader, and a second portion of the flow will flow downwardly through a space defined by the oblique angle between the aft edge and the back plate so as to be distributed on a region of a field located generally beneath the spreader.

18. The flow distributor of claim 17, wherein the flow distributor comprises a first adjusting mechanism and a second adjusting mechanism, wherein the first adjusting mechanism is further operable for moving the second end portion upwardly and downwardly relative to the discharge opening, and wherein the first adjusting mechanism is further operable for moving the flow guide in the fore and aft directions.

19. The flow distributor of claim 18, wherein the first adjusting mechanism includes an actuator remotely controllable for pivoting the second end portion of the flow guide in the fore and aft directions about the pivotable member of the movable portion guide for varying the oblique angle between the aft edge and the back plate.

20. The flow distributor of claim 18, wherein the second adjustable mechanism includes one attachment point at the pivot point of the first end portion of the flow guide that connects the flow guide to the pivotable member and another attachment point including a bolt positioned through a slot in the first end portion and a portion of the pivotable member that connect the flow guide to the pivotable member.

* * * * *